United States Patent
Sawamura et al.

[11] Patent Number: 5,908,368
[45] Date of Patent: Jun. 1, 1999

[54] CONTROL SYSTEM FOR INHIBITING TORQUE INCREASE CORRESPONDING TO INCREASING THROTTLE OPENING DURING A STANDING START

[75] Inventors: Kazutomo Sawamura; Akira Kato; Yoshiharu Saito; Jun Takahashi, all of Wako, Japan

[73] Assignee: Honda Giken Kogyo Kabushiki Kaisha, Tokyo, Japan

[21] Appl. No.: 08/848,519

[22] Filed: Apr. 28, 1997

[30] Foreign Application Priority Data

Apr. 30, 1996 [JP] Japan .................................. 8-132778

[51] Int. Cl.$^6$ ...................................................... F02D 41/04
[52] U.S. Cl. ............................................. 477/109; 477/110
[58] Field of Search ..................................... 477/107, 109, 477/110, 111; 123/396, 399

[56] References Cited

U.S. PATENT DOCUMENTS

| | | | |
|---|---|---|---|
| 4,881,428 | 11/1989 | Ishikawa et al. | 477/111 X |
| 5,050,454 | 9/1991 | Yamaguchi et al. | 477/110 X |
| 5,460,580 | 10/1995 | Streib | 477/110 |
| 5,466,199 | 11/1995 | Kobayashi et al. | 477/110 X |
| 5,478,293 | 12/1995 | Yonezawa | 477/110 |
| 5,584,272 | 12/1996 | Pfeufer et al. | 123/399 X |

*Primary Examiner*—Khoi Q. Ta
*Attorney, Agent, or Firm*—Armstrong, Westerman, Hattori, McLeland & Naughton

[57] ABSTRACT

An output torque control system for an internal combustion engine for a vehicle is responsive to a stepping-on amount of the accelerator pedal, for controlling output torque from the engine. Upon detection of an operation for starting the vehicle, the output torque from the engine is inhibited from being controlled to an increased value in response to the stepping-on amount of the accelerator pedal over a predetermined time period. It is determined that the operation for starting the vehicle has been carried out, when the accelerator pedal has been stepped on and a change in the shift position of the automatic transmission has occurred.

9 Claims, 11 Drawing Sheets

CONTROL SYSTEM FOR INHIBITING TORQUE INCREASE CORRESPONDING TO INCREASING THROTTLE OPENING DURING A STANDING START

BACKGROUND OF THE INVENTION

1. Field of the Invention

This invention relates to an output control system for internal combustion engines for vehicles, which reduces output torque from the engine during starting of the vehicle with an accelerator pedal of the vehicle being stepped on when an automatic transmission of the engine is put in gear, to thereby reduce a gear-shifting shock.

2. Prior Art

Conventionally, there is known an engine output torque control system for an internal combustion engine with an automatic transmission and throttle valve-driving means for electrically controlling the opening of a throttle valve of the engine in response to stepping-on of an accelerator pedal of the vehicle. According to the control system, a desired output torque from the engine is calculated based on a gear shifting mode of the automatic transmission and an amount of stepping-on of the accelerator pedal, a desired opening of the throttle valve is calculated based on the calculated desired engine output torque and the rotational speed of the engine, and the throttle valve is controlled through the throttle valve-driving means such that the actual opening of the throttle valve becomes equal to the calculated desired opening, to thereby control the output torque from the engine.

An automotive vehicle with the above internal combustion engine and engine output control system installed therein is started from a standing position thereof, in such a manner that when the accelerator pedal is not stepped on, a shift lever of the automatic transmission is operated to change the shift position of the automatic transmission from a neutral (N) position or a parking (P) position to a drive (D) range or a reverse (R) range whereby the gear mechanism of the transmission is put in gear, i.e. a clutch thereof is engaged, and if the accelerator is then stepped on, the throttle valve is controlled to open in response to the amount of stepping-on of the accelerator pedal, so that a driving force is transmitted from the engine through the automatic transmission to driving wheels of the vehicle to start the vehicle.

However, if the accelerator pedal is suddenly or largely stepped on immediately after the gear mechanism is put in gear to start the vehicle, the output torque from the engine suddenly increases to cause a sudden change in the driving force, resulting in a large gear-shifting shock being given to the driver and passenger(s).

Such a gear-shifting shock can occur similarly even in the case where the shift position is changed to put the gear mechanism in gear in a state where the accelerator pedal has been stepped on.

SUMMARY OF THE INVENTION

It is the object of the invention to provide an output torque control system for internal combustion engines for vehicles, which is capable of adequately reducing a shock generated upon starting of the vehicle from a standing position thereof, with the accelerator pedal being stepped on immediately after the automatic transmission is put in gear or with the automatic transmission being put in gear in a state where the accelerator pedal has been stepped on.

To attain the above object, according to a first aspect of the invention, there is provided an output torque control system for an internal combustion engine for a vehicle, the engine having an automatic transmission, the vehicle having an accelerator pedal, the output torque control system including output torque control means responsive to an amount of stepping-on of the accelerator pedal, for controlling output torque from the engine, and shift position-detecting means for detecting a shift position of the automatic transmission.

The output torque control system according to the first aspect of the invention is characterized by comprising:

standing start operation-detecting means for detecting an operation for starting the vehicle from a standing position thereof; and standing start control means operable upon detection of the operation for starting the vehicle by the standing start operation-detecting means, for inhibiting the output torque control means from controlling the output torque from the engine to an increased value in response to the amount of stepping-on of the accelerator pedal.

Preferably, the standing start operation-detecting means determines that the operation for starting the vehicle has been carried out, when the accelerator pedal has been stepped on and a change in the shift position of the automatic transmission has occurred.

Preferably, when the accelerator pedal has been stepped on immediately after the change in the shift position of the automatic transmission occurred, the standing start control means inhibits the output torque control means from controlling the output torque from the engine to the increased value in response to the amount of stepping-on of the accelerator pedal over a predetermined time period, and after the predetermined time period elapses, the standing start control means controls the output torque control means so as to progressively increase the output torque from the engine to a value corresponding to the amount of stepping-on of the accelerator pedal.

Also preferably, when the change in the shift position of the automatic transmission has occurred in a state where the accelerator pedal has been stepped on, the standing start control means controls the output torque control means so as to hold the output torque from the engine at a value to be assumed when the engine is in a no-load condition over a predetermined time period, and after the predetermined time period elapses, the standing start control means controls the output torque control means so as to progressively increase the output torque from the engine to a value corresponding to the stepping-on amount of the accelerator pedal.

The above change in the shift position of the automatic transmission includes a change in the shift position of the automatic transmission from a shift position thereof for standing of the vehicle to a position thereof for traveling of the vehicle, and a change in the shift position of the automatic transmission from the shift position thereof for traveling of the vehicle to a shift position thereof for backward movement of the vehicle.

According to a second aspect of the invention, the output torque control system is characterized by comprising:

gradient-estimating means for estimating a gradient of a surface of a road on which the vehicle is standing or traveling;

output torque-calculating means for calculating a value of the output torque from the engine which can prevent a backward movement of the vehicle when the vehicle climbs the road, based on the gradient estimated by the gradient-estimating means; and standing start control means operable when the accelerator pedal has been stepped on and a change in the shift position of the automatic transmission has occurred, for determining a control amount by which the output torque control means is to control the output torque from the engine, based on the amount of stepping-on of the accelerator pedal and the value of the output torque from the engine calculated by the output torque-calculating means.

According to a third aspect of the invention, the output torque control system is characterized by comprising:

change amount-calculating means for calculating a change amount in a position of the accelerator pedal;

output torque-calculating means for calculating a desired value of the output torque from the engine and a time period over which the desired value of the output torque from the engine is to be maintained, based on the change amount in the position of the accelerator pedal calculated by the change amount-calculating means; and standing start control means operable when the accelerator pedal has been stepped on and a change in the shift position of the automatic transmission has occurred, for determining a control amount by which the output torque control means is to control the output torque from the engine, based on the amount of stepping-on of the accelerator pedal, and the desired value of the output torque from the engine and the time period calculated by the output torque-calculating means.

The above and other objects, features and advantages of the invention will become more apparent from the following detailed description taken in conjunction with the accompanying drawings.

BRIEF DESCRIPTION OF THE DRAWINGS

FIG. 8 is a graph similar to FIG. 6, showing the same relationship assumed during standing start of the vehicle in a manner that a shift lever position SP is changed from a neutral (N) position or a parking (P) position to a drive (D) range or an R range while the accelerator pedal is stepped on;

DETAILED DESCRIPTION

The invention will now be described in detail with reference to the drawings showing embodiments thereof.

Figure 1:
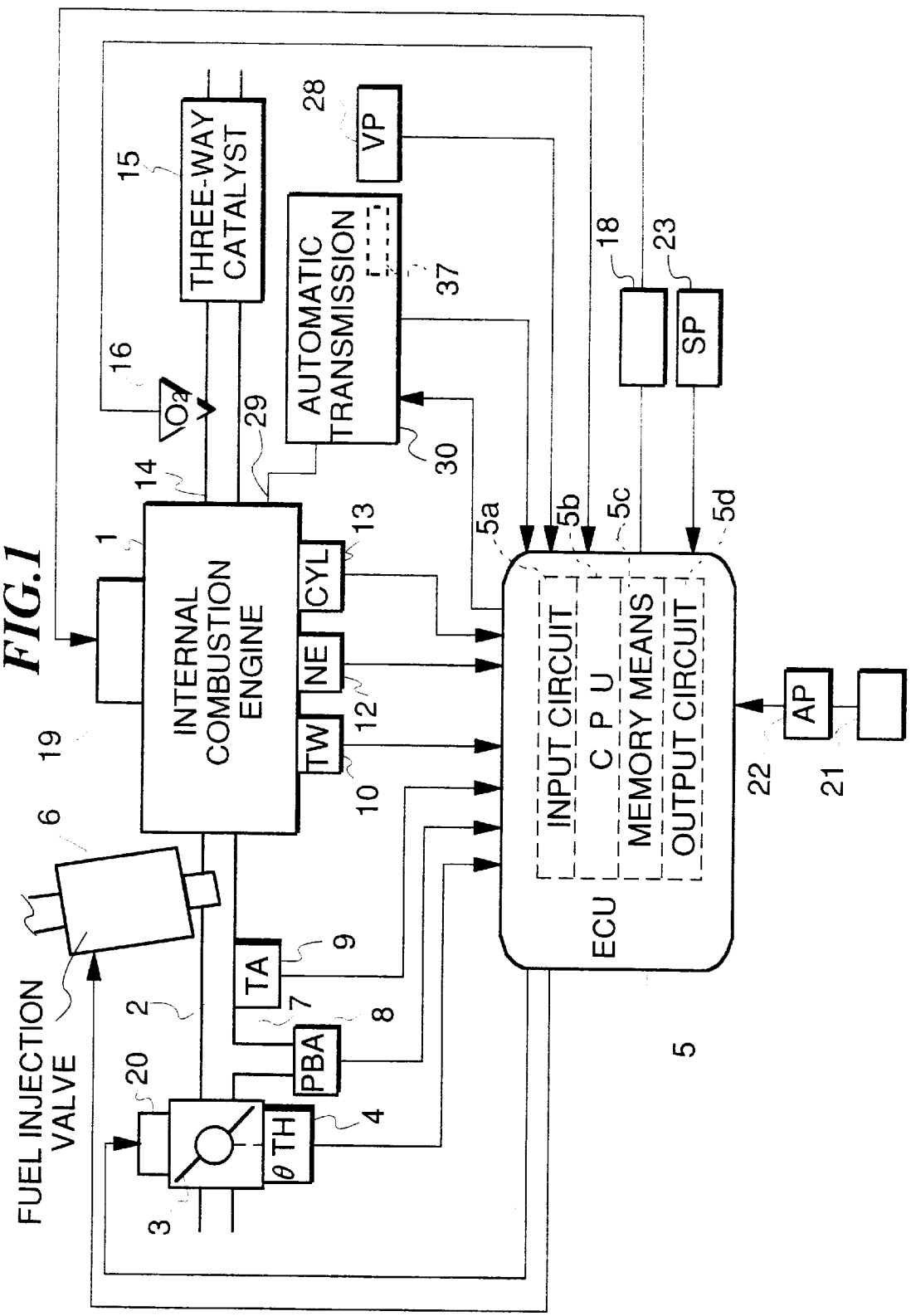
FIG. 1 is a block diagram schematically showing the whole arrangement of an internal combustion engine and an output torque control system therefor, according to an embodiment of the invention.

Referring first to FIG. 1, there is illustrated the whole arrangement of an internal combustion engine (hereinafter simply referred to as "the engine") and an output torque control system therefor, according to a first embodiment of the invention.

In the figure, reference numeral 1 designates an internal combustion engine for an automotive vehicle, which has a cylinder block to which is connected an intake pipe 2. A throttle valve 3 is arranged in the intake pipe 2 and mechanically connected to a throttle actuator 20 formed, e.g. of an electric motor, for electrically driving the throttle valve 3. The throttle actuator 20 is electrically connected to an electronic control unit (hereinafter referred to as "the ECU") 5 which controls the opening θTH of the throttle valve 3 through the throttle actuator 20. A throttle valve opening (θTH) sensor 4 is connected to the throttle valve 3 and electrically connected to the ECU 5, for supplying an electric signal indicative of the sensed throttle valve opening θTH to the ECU 5.

Fuel injection valves 6, only one of which is shown, are inserted into the intake pipe 2 at locations intermediate between respective cylinders of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is communicated with the interior of the intake pipe 2 via a conduit 7 at a location immediately downstream of the throttle valve 3, for sensing absolute pressure or intake pressure (PBA) within the intake pipe 2, and is electrically connected to the ECU 5, for supplying an electric signal indicative of the sensed absolute pressure PBA to the ECU 5. Further, an intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1 which is filled with engine coolant, for supplying an electric signal indicative of the sensed engine coolant temperature TW to the ECU 5.

An engine rotational speed (NE) sensor 12 and a cylinder-discriminating sensor (hereinafter referred to as "the CYL sensor") 13 are arranged in facing relation to a camshaft or a crankshaft of the engine 1, neither of which is shown. The NE sensor 12 generates a signal pulse (hereinafter referred to as "a TDC signal pulse") at each of predetermined crank angles (e.g. whenever the crankshaft rotates through 180 degrees when the engine is of the 4-cylinder type) which each correspond to a predetermined crank angle before a top dead point (TDC) of each cylinder corresponding to the start of the intake stroke of the cylinder. The CYL sensor 13 generates a signal pulse (hereinafter referred to as "a CYL signal pulse") at a predetermined crank angle of a particular cylinder of the engine 1. The CYL signal pulse and TDC signal pulse are supplied to the ECU 5.

A spark plug 19 is arranged in each cylinder of the engine 1 and electrically connected to the ECU 5 through a distributor 18 to have ignition timing thereof controlled by a signal from the ECU 5.

A three-way catalyst (catalytic converter) 15 is arranged in an exhaust pipe 14 of the engine 1, for purifying noxious components in exhaust gases emitted from the engine 1, such as HC, CO, and NOx. An oxygen concentration sensor (hereinafter referred to as "the O2 sensor") 16 as an air-fuel ratio sensor is arranged in the exhaust pipe 14 at a location upstream of the catalytic converter 15, which detects the concentration of oxygen present in exhaust gases and supplies an electric signal indicative of the sensed oxygen concentration to the ECU 5.

Further connected to the ECU 5 is an automatic transmission 30 which has a 4-speed position type. A shift position (SP) sensor 23 is electrically connected to the ECU 5, to detect the position of a shift lever, not shown, (hereinafter referred to as "shift position SP") for selecting an operating mode of the automatic transmission 30 and supply a signal indicative of the detected shift position SP to the ECU 5. Further electrically connected to the ECU 5 is a vehicle speed (VP) sensor 28 for detecting the traveling speed (vehicle speed) VP of the automotive vehicle in which the engine 1 is installed and supplying a signal indicative of the sensed vehicle speed VP to the ECU 5.

Also electrically connected to the ECU 5 is an accelerator pedal position (AP) sensor 22 for detecting the position AP of an accelerator pedal 21 of the vehicle (hereinafter also referred to as "the accelerator pedal opening AP"). The ECU 5 controls the operation of the throttle actuator 20 in response to the accelerator pedal position AP detected by the accelerator pedal position sensor 22, etc. In the present embodiment, the accelerator pedal 21 and the throttle valve 3 are not mechanically connected to each other, but the opening θTH of the throttle valve 3 is controlled by the ECU 5 through the throttle actuator 20 in response to operating parameters of the engine including the accelerator pedal position AP.

The ECU 5 is comprised of an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter referred to as the "the CPU") 5b, memory means 5c storing various operational programs which are executed by the CPU 5b, and for storing results of calculations therefrom, etc., and an output circuit 5d which supplies driving signals to the fuel injection valves 6, the spark plugs 19, the throttle actuator 20, etc., and also supplies control signals to the automatic transmission 30.

Figure 2:
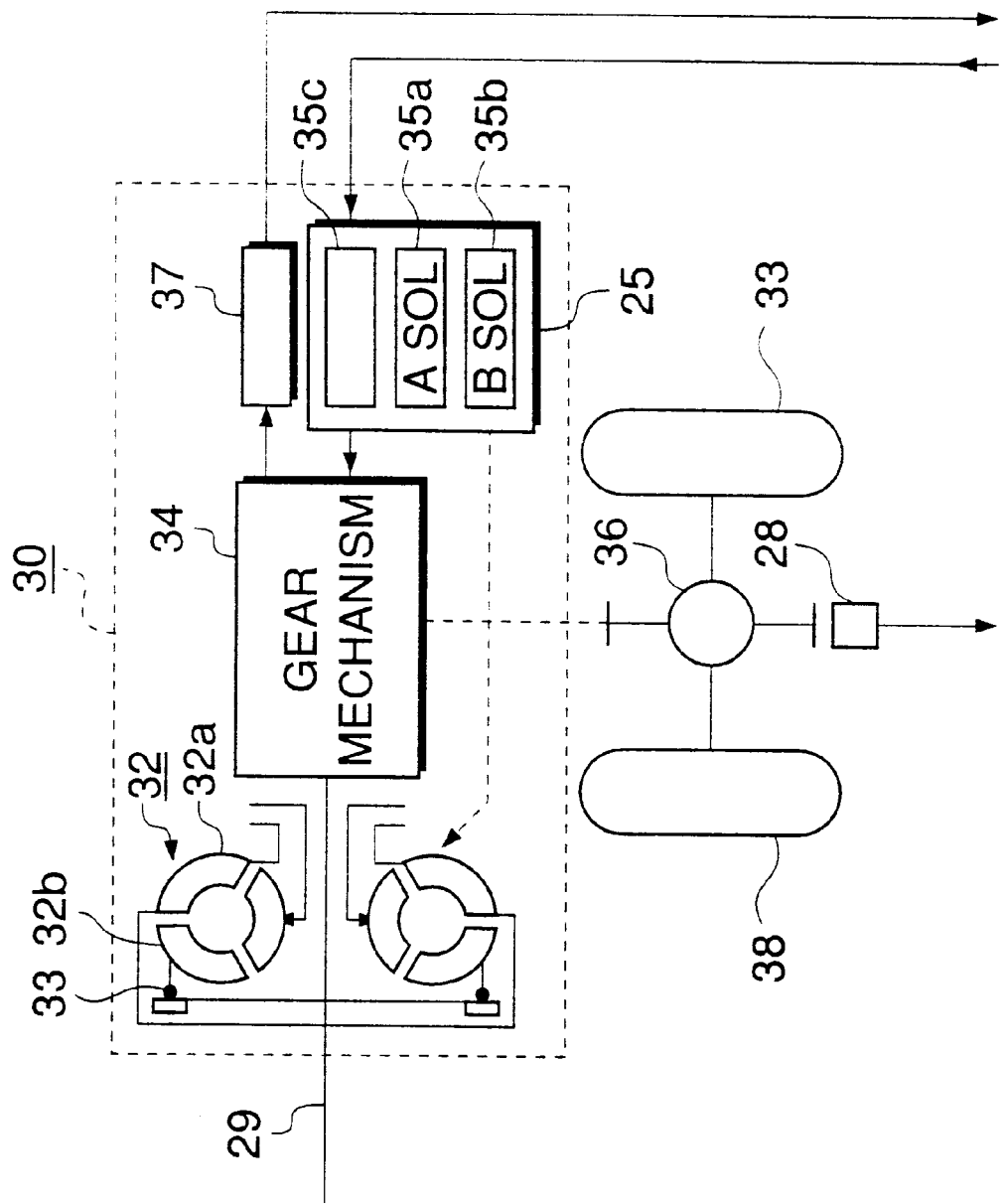
FIG. 2 is a diagram schematically showing the construction of an automatic transmission of the engine in FIG. 1.

FIG. 2 shows the construction of the automatic transmission 30.

The automatic transmission 30 is comprised of a torque converter 32 which is coupled to an output shaft 29 of the engine 1 and has a pump 32am and a turbine 32b. A lock-up clutch 33 for coupling the pump 32a and the turbine 32b together, a gear mechanism 34 coupled to an output side of the torque converter 32, and a hydraulic control mechanism 35 for controlling the operations of the lock-up clutch 33 and the gear mechanism 34.

The hydraulic control mechanism 35 is comprised of an on-off type solenoid valve (hereinafter referred to as "the A solenoid valve") 35a for selectively engaging and disengaging the lock-up clutch 33, a duty-controlled type solenoid valve (hereinafter referred to as "the B solenoid") 35b for controlling the engaging force of the lock-up clutch 23 when it is in an engaged state, and a gear-shifting actuator 35c for controlling a gear position (gear ratio) of the gear mechanism 34.

The A solenoid valve 35a, the B solenoid valve 35b, and the gear-shifting actuator 35c are electrically connected to the ECU 5, which controls the engaging state of the lock-up clutch 33 by driving the A solenoid 35a and the B solenoid 35b and controls the gear position of the gear mechanism 34 by driving the gear-shifting actuator 35c.

The automatic transmission 30 is provided with a gear position sensor 37 for detecting the gear position INGEAR of the gear mechanism 34 and supplying a signal indicative of the sensed gear position to the ECU 5.

Output from the engine 1 is transmitted from the output shaft 29 through the torque converter 32, the gear mechanism 34, and a differential 36 to left and right driving wheels 38 and 39 of the vehicle.

Next, a manner of controlling output torque from the engine 1 according to the present embodiment will be described with reference to FIG. 3, which shows a main routine for carrying out engine output torque control processing, which is repeatedly executed by the CPU 5a at predetermined time intervals (e.g. 5 ms).

First, at a step S11, values of the vehicle speed VP sensed by the vehicle speed sensor 33, the accelerator pedal position AP sensed by the accelerator pedal sensor 22, the shift position SP sensed by the SP sensor 23, and the gear ratio INGEAR sensed by the gear position sensor 37 are fetched.

Then, at a step S12, a desired engine output torque TECMD is calculated based on the values of vehicle speed VP, accelerator pedal position AP, shift position SP, and gear ratio INGEAR. More specifically, a desired driving torque (desired wheel-driving torque TDSCMD) is determined from a VP-AP map according to the vehicle speed VP and the accelerator pedal position AP, and based on the determined desired driving torque TDSCMD, the desired engine output torque TECMD is calculated by the use of the following equation (1):

$$TECMD = TDSCMD / INGEAR / KETR \qquad (1)$$

where KETR represents a correction value which is based on the transmission efficiency of the torque converter 32 determined according to a slip ratio e (=input side rotational speed of the torque converter/output side rotational speed of the same).

Then, at a step S13, in-gear job control is carried out in the following manner: It is first determined whether a predetermined standing start condition is fulfilled, which is a condition that the accelerator pedal is suddenly or largely stepped on to start the vehicle immediately after the shift position of the automatic transmission 30 has been changed from a neutral (N) position or a parking (P) position to a drive (D) range or a condition that the shift position of the automatic transmission is similarly changed in a state where the accelerator pedal is stepped on or immediately after it has been stepped on. If the predetermined standing start condition is fulfilled, the desired engine output torque TECMD is set to and held at a value TEIDLE of the engine output torque assumed immediately before the predetermined standing start condition becomes fulfilled, over a predetermined time period. After the lapse of the predetermined time period, the desired engine output torque is progressively increased from the above value TEIDLE until it becomes equal to a value commensurate with the stepping-on amount of the accelerator pedal. A desired throttle valve opening THFF is calculated based on the desired engine output torque thus calculated and the rotational speed NE of the engine 1.

Then, at a step S14, the throttle valve 3 is controlled through the throttle actuator 20 such that the valve opening θTH of the throttle valve 3 becomes equal to the calculated desired throttle valve opening THFF.

Figure 3:
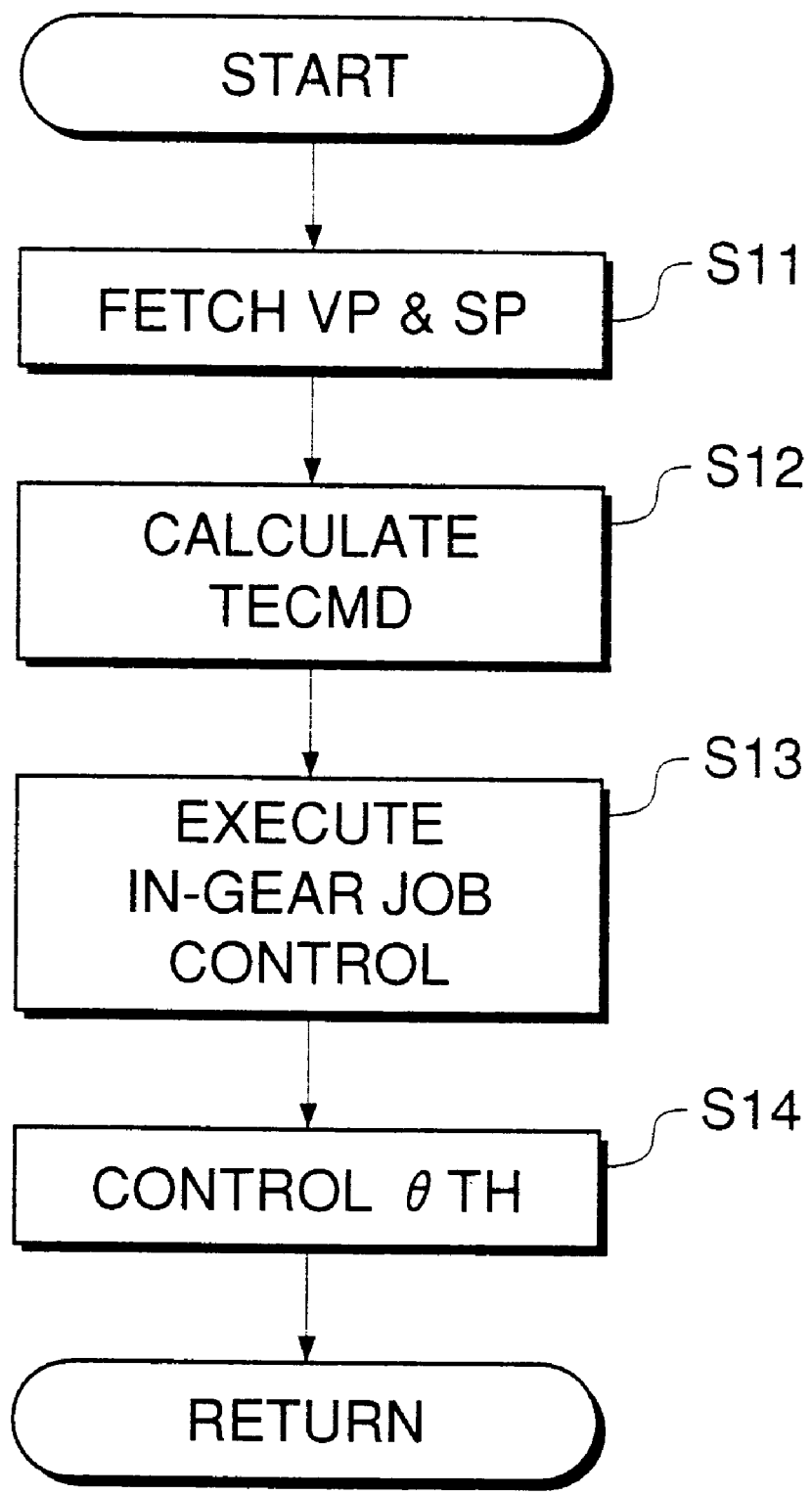
FIG. 3 is a flowchart showing a main routine for controlling the output torque from the engine, which is executed by an ECU appearing in FIG. 1.
Figure 4:
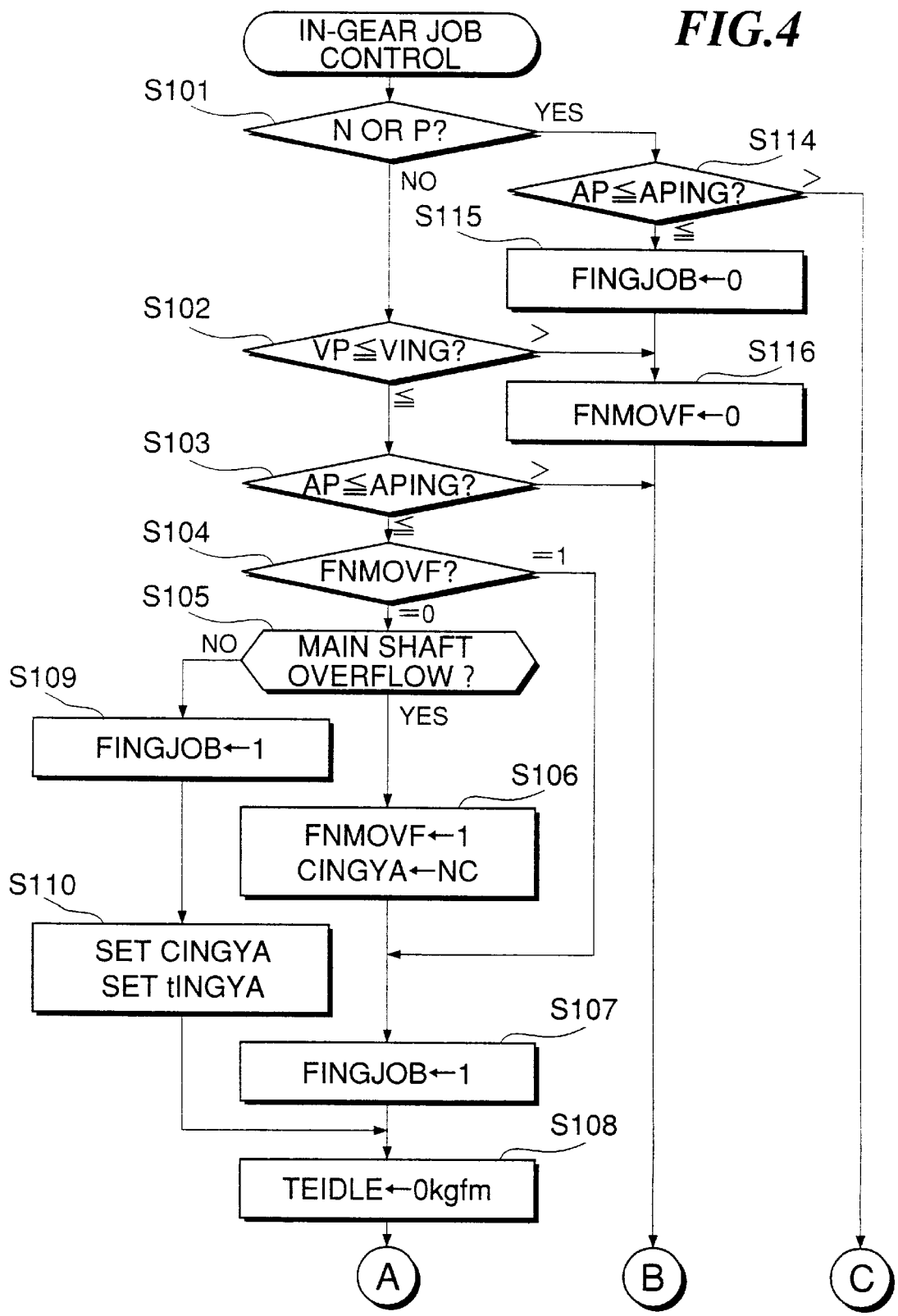
FIG. 4 is a flowchart showing an in-gear job control routine which is executed by a step S13 in FIG. 3.
Figure 5:
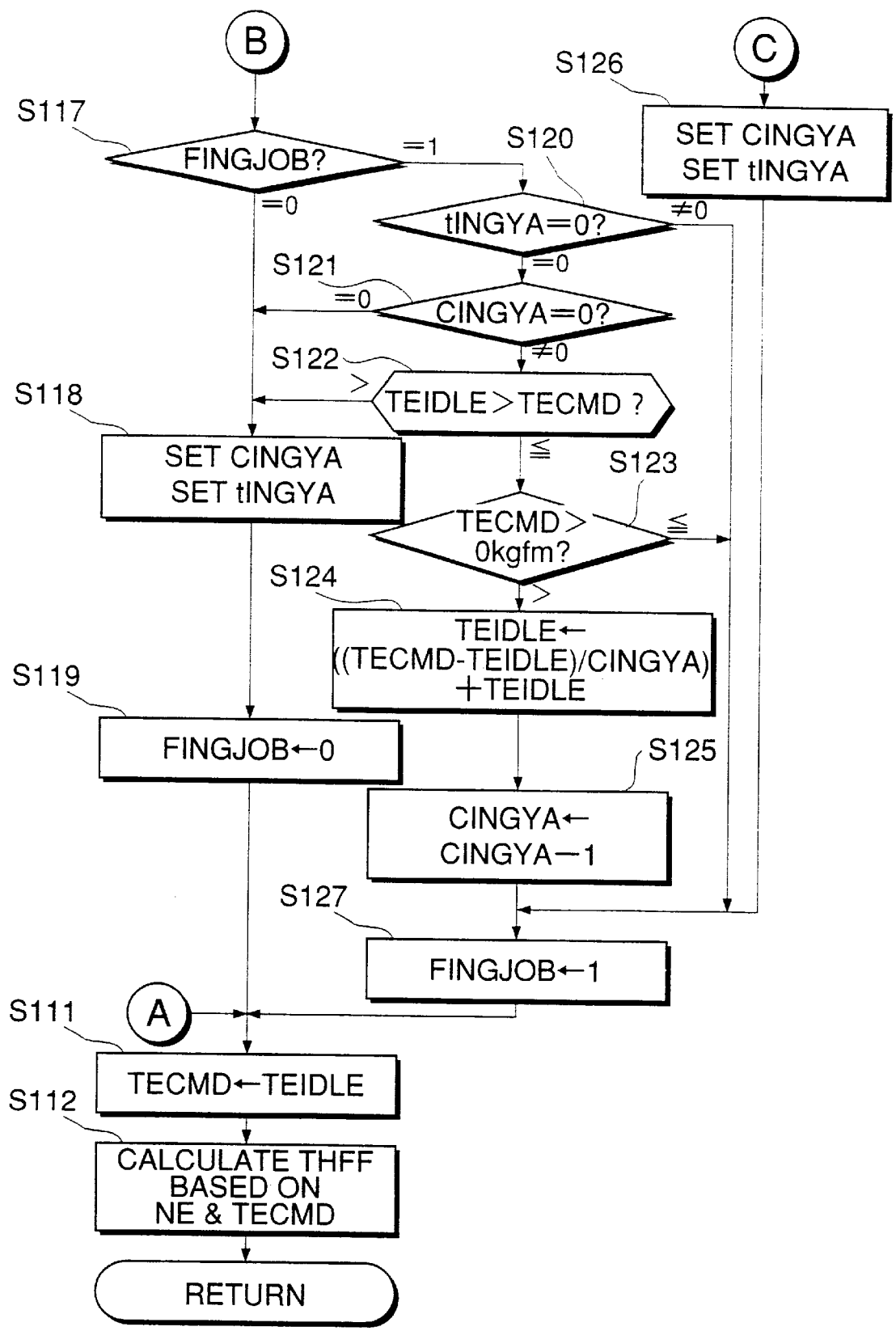
FIG. 5 is a flowchart showing a continued part of the FIG. 4 routine.

Next, details of the in-gear job control will be described with reference to FIGS. 4 and 5 showing a flowchart of the in-gear job control executed at the step S13 in FIG. 3.

First, at a step S101, it is determined based on the output signal from the SP sensor 23 whether or not the shift position SP is the neutral (N) position or the parking (P) position. If the shift position SP is the neutral (N) position or the parking (P) position, the program proceeds to a step S114, wherein it is determined whether the accelerator pedal opening AP is equal to or smaller than a predetermined opening value APING set to a lower limit at or below which the present in-gear job control is to be inhibited.

If AP≦APING holds, it is judged that the shift position SP has not been changed from the N or P position to the D range or the reverse (R) range in a state where the accelerator pedal has been stepped on, and then the program proceeds to a step S115, wherein a flag FINGJOB, which, when set to "1", indicates that the in-gear job control is being executed, is set to "0".

At the following step S116, a flag FNMOVF, which when set to "1", indicates that the main shaft of the automatic transmission 30 is in an overflow state, is set to "0". The overflow state means that the shift position SP is changed from the N or P position to the D range or the R range to engage a clutch of the gear mechanism 34 when the vehicle speed VP is equal to 0 km/h, so that the output shaft of the torque converter 32 is in stoppage together with the driving wheels 38 and 39. When the main shaft is not in the overflow state, it means that all the transmission clutches of the gear mechanism 34 are disengaged so that the output shaft of the torque converter 32 is rotating at a speed almost equal to that of the rotating output shaft of the engine 1.

Then, the program proceeds to a step S117, wherein it is determined whether the flag FINGJOB assumes "1". In the present loop, the flag FINGJOB has been set to "0" at the step S115, and therefore the program proceeds to a step S118, wherein an in-gear job execution counter CINGYA and an after-in-gear engine torque-holding timer tINGYA are set and started, and at the following step S119, the flag FINGJOB is set to "0".

Then, the program proceeds to a step S111, wherein the desired engine output torque TECMD is set to a present value, i.e. the engine output torque TEIDLE assumed immediately before the accelerator pedal is stepped on. Then, at a step S112, the desired throttle valve opening THFF is calculated based on the desired engine output torque TECMD thus set and the engine rotational speed NE. More specifically, the desired throttle valve opening THFF is determined from a table according to the desired engine output torque TECMD and the engine rotational speed NE. After the calculation of the desired throttle valve opening THFF, the present routine is terminated.

On the other hand, if it is determined at the step S101 that the shift position SP is not the N or P position, it is judged that the automatic transmission has been put in gear, and then the program proceeds to a step S102, wherein it is determined whether or not the vehicle speed VP is equal to or lower than a predetermined lower limit value VING (e.g. a value close to 0 km/h) for determining an overflow of the main shaft, in other words, whether the vehicle is in a standing position or traveling. If VP≦VING holds, that is, the vehicle is standing, the program proceeds to a step S104, whereas if VP>VING holds, that is, the vehicle is traveling, the program proceeds to the step S116. At the step S104, it is determined whether or not the flag FNMOVF assumes "0", and if it assumes "0", the program proceeds to a step S105, wherein it is determined whether or not the main shaft is in the overflow state. If the main shaft is in the overflow state, that is, the overflow state has been first detected in the present loop, the flag FNMOVF is set to "1" and the counter CINGYA is set to a predetermined count value NC (e.g. 10) and started at a step S106, and the flag FINGJOB is set to "1" at a step S107. The predetermined count value NC is a value used for engine output control in normal standing start of the vehicle, as hereinafter described.

Then, at a step S108, the present engine output torque TEIDLE is set to 0 kgfm, followed by execution of the steps S111 and S112, whereby the throttle valve opening θTH is set to a value corresponding to the desired engine output torque TECMD which has been set to 0 kgfm at the step S111 (i.e. a value corresponding to the fully closed position).

On the other hand, if it is determined at the step S104 that the flag FNMOVF assumes "1", the program skips over the steps S105 and S106 to execute the steps S107 et seq., followed by terminating the present routine.

If it is determined at the step S105 that the main shaft is not in the overflow state, it is judged that there is a possibility that the accelerator pedal will be stepped on by a predetermined amount or more after the gear mechanism has been put in gear, and at a step S109, the flag FINGJOB is set to "1", and at a step S110, the counter CINGYA and the timer tINGYA are set and started, followed by executing the steps S108 et seq. Thus, the throttle valve opening θTH is held at a value corresponding to the desired engine output torque TECMD (=0 kgfm).

If AP>APING holds at the step S103 after the flag FINGJOB has been set to "1", it is determined at the step S117 that the flag FINGJOB assumes "1", and then it is determined at a step S120 whether or not a predetermined time period or count value has been counted up by the timer tINGYA. If it has not been counted up, the program proceeds to a step S127, wherein the flag FINGJOB is held at "1", and then the steps S111 and S112 are executed to hold the throttle valve opening θTH at the value corresponding to the desired engine output torque TECMD (=0 kgfm). Thus, the throttle valve opening θTH is held at the value corresponding to the desired output torque TECMD (=0 kgfm) to thereby hold the engine output torque TEIDLE at zero until the predetermined time period is counted up by the timer tINGYA.

On the other hand, if it is determined at the step S120 that the predetermined time period has been counted up by the timer tINGYA, the program proceeds to a step S121, wherein it is determined whether or not the count value of the counter CINGYA is equal to "0". If the count value is not equal to "0", the program proceeds to a step S122.

At the step S122, it is determined whether or not the present engine output torque TEIDLE exceeds the desired engine output torque TECMD (TEIDLE>TECMD). IF TEIDLE≦TECMD holds, it is judged that the present engine output torque has not yet been increased up to the desired engine output torque TECMD, and then the program proceeds to a step S123.

At the step S123, it is determined whether or not the desired engine output torque TECMD exceeds 0 kgfm. If the answer is affirmative (YES), it is judged that the accelerator pedal has not been returned, and then at a step S124 the present engine output torque TEIDLE is progressively increased toward the desired engine output torque TECMD, by the use of the following equation (2):

TEIDLE ((TECMD−TEIDLE)/CINGYA)+TEIDLE)  (2)

where TEIDLE on the right side represents the last value of TEIDLE.

The counter CINGYA is decremented by 1 whenever the above calculation is executed, as hereinafter described, and therefore, by using the above equation, it is made possible to first progressively increase the present engine output torque TEIDLE at a gentle rate and then progressively increase the same at a gradually increasing rate toward the desired engine output torque TECMD, so that the present engine output torque is smoothly increased up to the desired engine output torque TECMD.

Then, at a step S125 the counter CINGYA is decremented by 1, and at a step S127 the flag FINGJOB is held at "1", followed by execution of the steps S111 and S112 so that the throttle valve θTH is progressively increased, according to which the throttle valve 3 is controlled toward an controlled opening side (step S14 in FIG. 3).

If it is determined at the step S123 that TECMD≦0 kgfm, the program skips over the steps S124 and S125 to execute the steps S127 et seq.

Thereafter, if it is determined at the step S102 that VP>VING holds as the present engine output torque TEIDLE is increased, that is, the vehicle has been started to travel, the flag FNMOVF is set to "0" at the step S116. Then, the steps S117 et seq. are executed to increase the present engine output torque TEIDLE until it is determined at the step S121 that the count value of the counter CINGYA is equal to "0" or at the step S122 that present engine output torque TEIDLE exceeds the desired engine output torque TECMD, i.e. the present engine output torque TEIDLE has reached the desired engine output torque TECMD.

When it is determined at the step S121 that the count value of the counter CINGYA is equal to "0" or at the step S122 that TEIDLE>TECMD holds, the steps S118 et seq. are executed, followed by terminating the present routine.

On the other hand, if it is determined at the step S114 that the accelerator pedal opening AP is larger than the predetermined opening APING after it is determined at the step S101 that the shift position SP is the N or P position, it is judged that there is a possibility that the shift position SP will be changed from the N or P position to the D range or R range in the state where the accelerator pedal has been stepped on, and then at the step S126 the counter CINGYA and the timer tINGYA are set and started, and then at the step S127 the flag FINGJOB is set to "1", followed by execution of the steps S111 and S112.

Figure 6A:
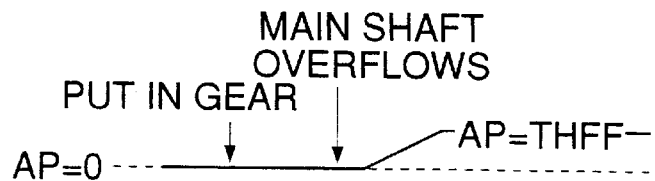
FIG. 6 is a graph showing the relationship between throttle valve opening θTH and output torque from the engine, which is assumed during normal standing start of the vehicle.
Figure 6B:
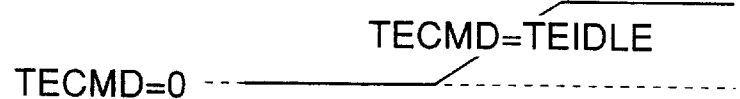

The relationship between the throttle valve opening θTH and the engine output torque, obtained by the above described control will now be explained with reference to FIGS. 6 to 8. FIG. 6 shows a case where a normal standing start is carried out, FIG. 7 a case where a standing start is carried out such that the accelerator pedal is stepped on by the predetermined amount or more immediately after the automatic transmission has been put in gear, and FIG. 8 a case where a standing start is carried out such that the shift position SP is changed from the N or P position to the D range or the R range in a state where the accelerator pedal is stepped on.

First, reference is made to the relationship between the throttle valve opening θTH and the engine output torque assumed when the normal standing start is carried out. In this case, as shown in FIG. 6, after the main shaft is brought into an overflow state (the answer to the question of the step S105 is YES) following putting-in-gear of the automatic transmission (the answer to the question of the step S101 is NO), the accelerator pedal is stepped on (the answer to the step S103 is NO). That is, the accelerator pedal is stepped on after the lapse of the predetermined time period counted by the timer tINGYA (the answer to the question of the step S120 is YES). Immediately upon the stepping-on of the accelerator pedal, the opening θTH of the throttle valve 3 is controlled such that progressive increase of the present engine output torque TEIDLE is started to progressively increase the engine output torque TEIDLE toward the desired engine output torque TECMD calculated based on the accelerator pedal opening AP over the predetermined time period CINGYA (=NC) which is set to a relatively short time period (steps S121 to S112).

Figure 7A:
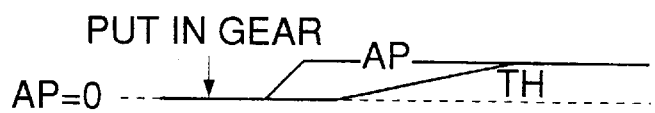
FIG. 7 is a graph similar to FIG. 6, showing the relationship assumed during standing start of the vehicle in a manner that the accelerator pedal is stepped on by a predetermined amount or more during rotation of a main shaft of the automatic transmission immediately after the transmission is put in gear.
Figure 7B:
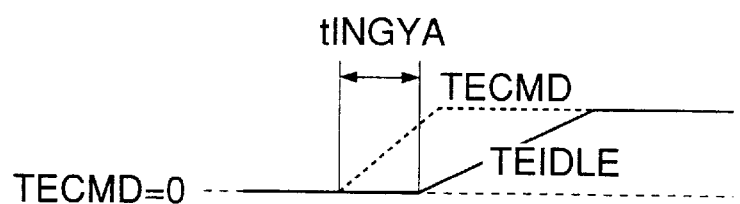

Next, in the case of the standing start carried out such that the accelerator pedal is stepped on by the predetermined amount or more during rotation of the main shaft immediately after the automatic transmission has been put in gear, as shown in FIG. 7, the desired engine output torque TECMD is set to and held at 0 kgfm (steps S108 to S111) until the predetermined time period tINGYA is counted up by the timer tINGYA (the answer to the question of the step S120 is YES) after the automatic transmission has been put in gear (the answer to the question of the step S101 is NO), and after the lapse of the predetermined time period tINGYA (the answer to the question of the step S120 is YES), the opening θTH of the throttle valve 3 is controlled such that the engine output torque TEIDLE is progressively increased toward the desired engine output torque TECMD calculated based on the accelerator pedal opening AP over the predetermined time period CINGYA which is set to the relatively long time period (steps S121 to S112).

Figure 8A:
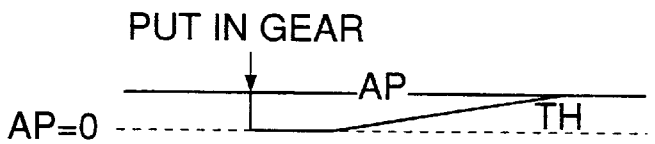
Figure 8B:
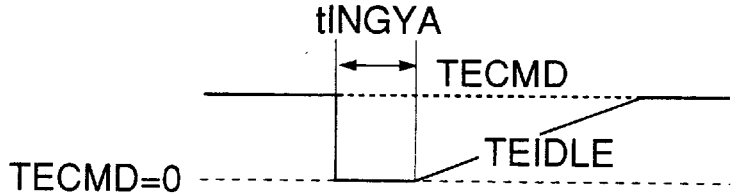

In the case of the standing start carried out such that the shift position SP is changed from the N or P position to the D range or the R range in a state where the accelerator pedal is stepped on, as shown in FIG. 8, the desired engine output torque TECMD is set to and held at 0 kgfm (the steps S108 to S111) until the predetermined time period tINGYA is counted up by the timer tINGYA after the automatic transmission is put in gear (the answer to the question of the step S101 is NO), and after the lapse of the predetermined time period tINGYA (the answer to the question of the step S120 is YES), the opening θTH of the throttle valve 3 is controlled such that the engine output torque TEIDLE is progressively increased toward the desired engine output torque TECMD calculated based on the accelerator pedal opening AP over the predetermined time period CINGYA which is set to a relatively long time period (steps S121 to S112).

As described above, according to the present embodiment, the desired engine output torque TECMD is set to and held at 0 kgfm until the predetermined time period tINGYA is counted up by the timer tINGYA after the automatic transmission is put in gear or the accelerator pedal is stepped on, and after the lapse of the predetermined time period tINGYA, the engine output torque TEIDLE is progressively increased toward the desired engine output torque calculated based on the accelerator pedal opening AP to thereby control the opening θTH of the throttle valve 3. As a result, a gear-shifting shock can be reduced in a predetermined standing start carried out such that the accelerator pedal is suddenly or largely stepped on after the shift position of the automatic transmission 30 has been changed from the N or P position to the D range or from the D range to the R position, or such that the shift position is changed from the N or P position to the D range or from the D range to the R range after the accelerator pedal position has been stepped on.

Figure 9:
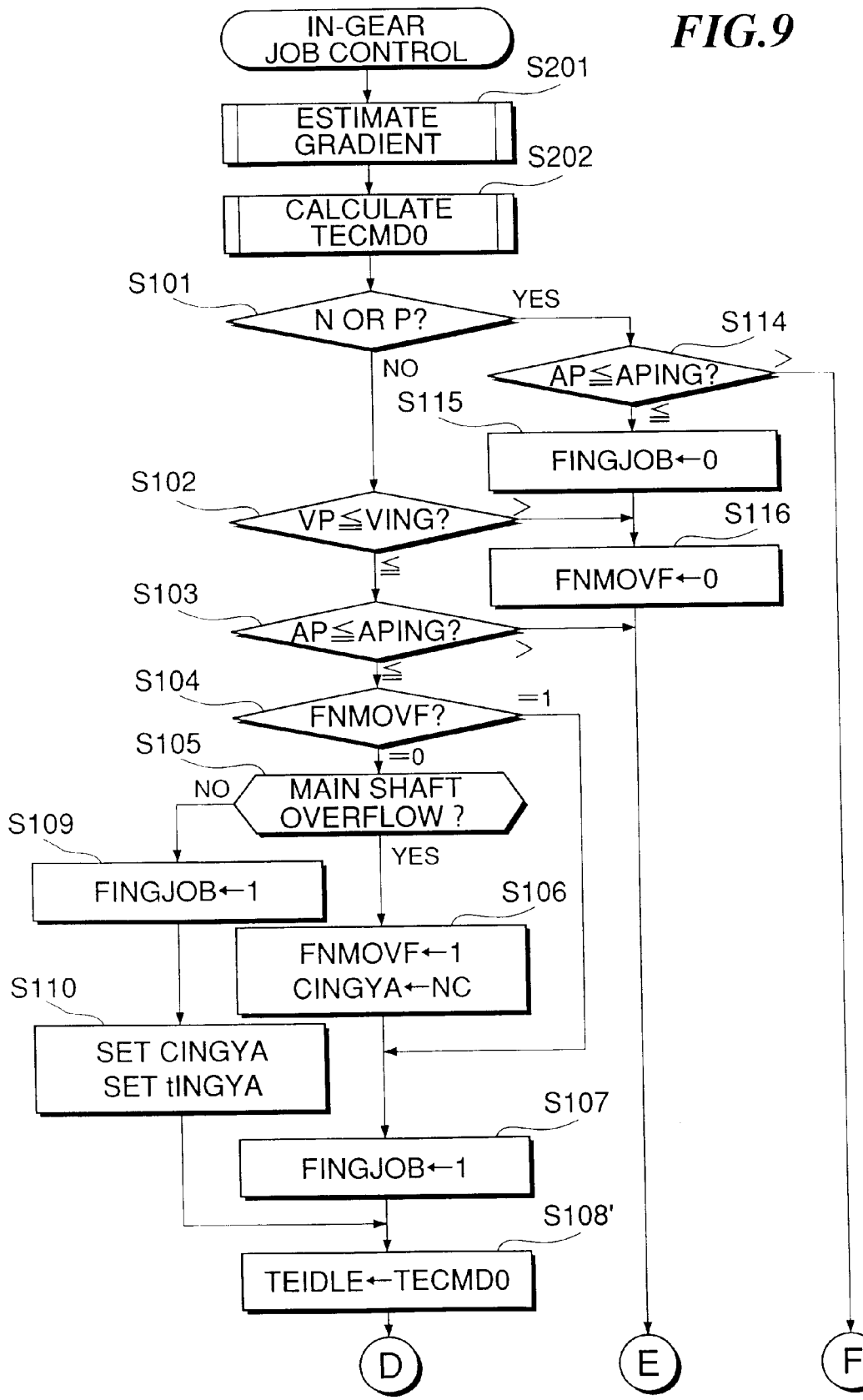
FIG. 9 is a flowchart showing an in-gear job control routine executed by an output torque control system for an internal combustion engine, according to a second embodiment of the invention.
Figure 10:
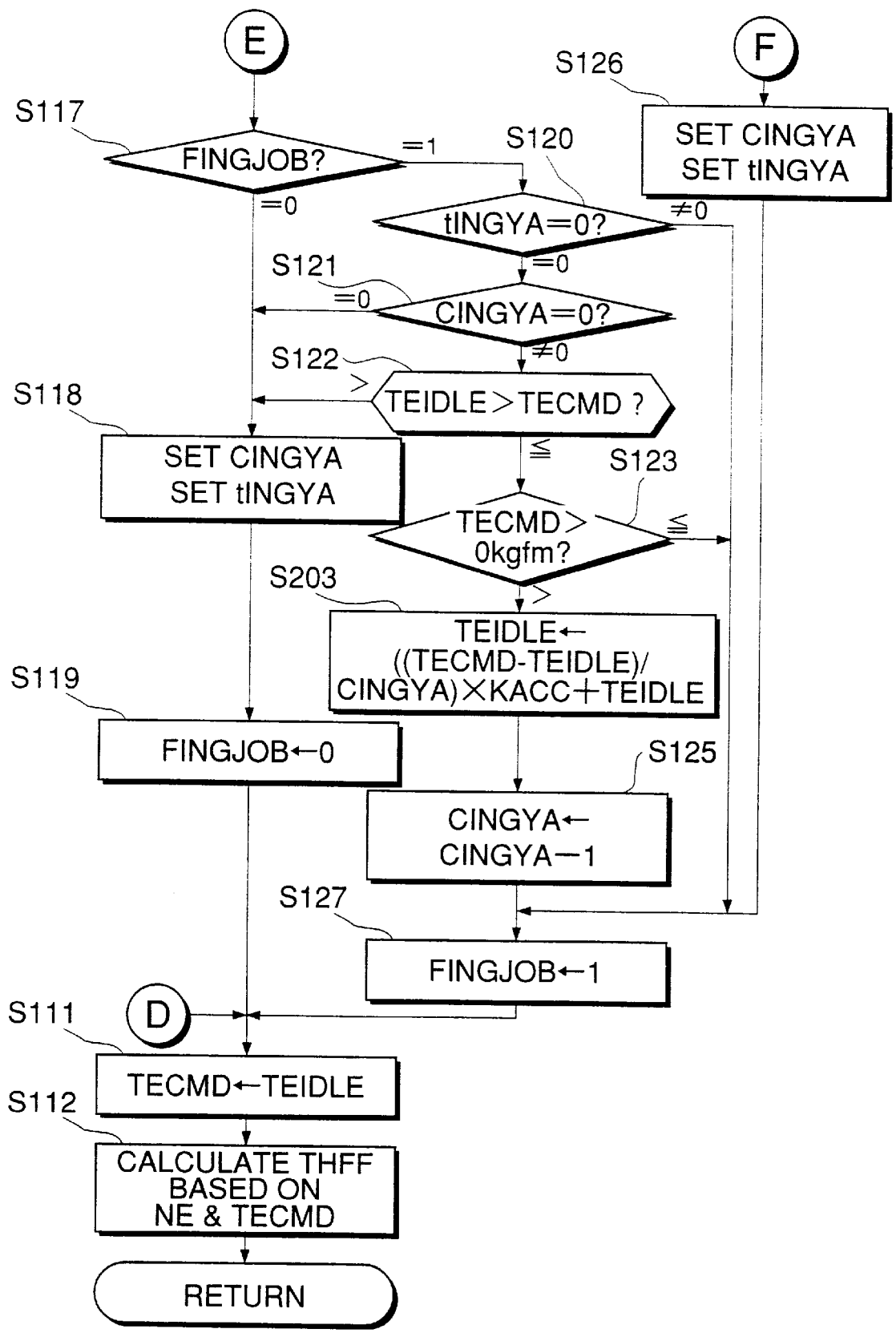
FIG. 10 is a flowchart showing a continued part of the FIG. 9 routine.
Figure 15:
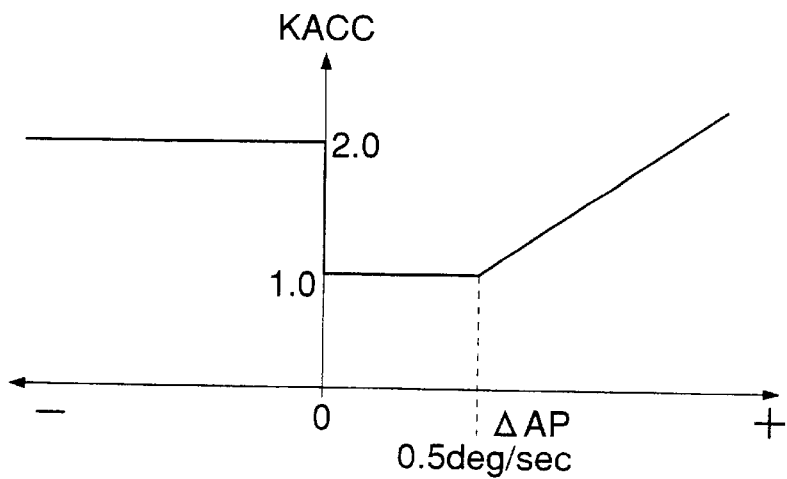
FIG. 15 is a table for determining a coefficient KACC according to the change amount ΔAP in the accelerator pedal position.

Next, a second embodiment of the invention will be described with reference to FIGS. 9, 10 and 15. FIGS. 9 and 10 show a flowchart of an in-gear job control routine according to the second embodiment, and FIG. 15 shows a table for determining a coefficient KACC according to a change amount ΔAP in the accelerator pedal position.

The present embodiment is distinguished from the above described first embodiment in that a G sensor, not shown, for estimating the gradient of the road surface on which the vehicle is standing or traveling is provided, a value of the gradient is estimated based on an output signal from the G sensor, an optimal or desired engine output TECMD0 which can prevent a backward movement of the vehicle being started from a standing position on an ascending slope is calculated based on the estimated gradient value, the throttle valve opening θTH of the throttle valve 3 is calculated such that the engine output torque becomes equal to the optimal engine output torque TECMD0, and thereafter the engine output torque is progressively increased in a manner taking into account the change amount ΔAP toward a value corresponding to the stepping-on amount of the accelerator pedal. In FIGS. 9 and 10, steps corresponding to those used in the first embodiment are designated by identical step numbers, and description of them is omitted.

First, at a step S201 in FIG. 9, a value of the gradient of the road surface on which the vehicle is standing is estimated based on the output signal from the G sensor, and an amount of change in the accelerator pedal position AP per unit time period is detected as an accelerator pedal position thereof change amount ΔAP. Then, at a step S202, the optimal or desired engine output. TECMD0 which can prevent a backward movement of the vehicle being started from a standing position thereof on an ascending slope is calculated based on the estimated gradient value. More specifically, first, an angle θ is determined based on the output signal from the G sensor. The angle θ indicates the gradient of the road surface on which the vehicle is standing. Based on the determined angle θ, a required driving torque TDS is calculated by the use of the following equation (3):

$$TDS = \gamma \times m \times \sin\theta \quad (3)$$

where γ represents the radius of the tire, m the weight of the vehicle, and θ the angle indicating the gradient of the road surface obtained at the step S201.

The required driving torque TDS can also be determined by the following equation (4):

$$TDS = K0 \times T0 \times IIst \times If \times (NEreq/1000)2 \quad (4)$$

where K represents the torque ratio of the torque converter assumed when the slip ratio is zero, T0 a capacity coefficient of the torque converter assumed when the slip ratio is zero, IIst the gear ratio of the automatic transmission in the 1st speed position, If the final gear ratio of the transmission, and NEreq required engine rotational speed.

From the above equations (3) and (4), the required engine rotational speed NEreq can be determined by the following equation (5):

$$NEreq = \{(\gamma \times m \times \sin\theta)/(K0 \times T0 \times IIst \times If)\}^{1/2} \times 1000 \quad (5)$$

Therefore, the optimal engine output torque TECMD0 can be calculated by the following equation (6):

$$TECMD0 = \gamma \times (NEreq/1000)2 \quad (6)$$

where γ represent the capacity coefficient of the torque converter.

The optimal engine output torque TECMD0 thus calculated is set as the present engine output torque TEIDLE at a step S108' in FIG. 9.

At a step S203 in FIG. 10, a calculation is made of the present engine output torque TEIDLE to progressively increase the torque TEIDLE toward the desired engine output torque TECMD. More specifically, the following equation (7) is solved:

$$TEIDLE = \{(TECMD - TEIDLE)/CINGYA) \times KACC + TEIDLE\} \quad (7)$$

where TEIDLE on the right side represents the last value of TEIDLE, of which an initial value is set to the optimal engine output torque TECMD0 calculated as above. KACC represents a coefficient which is set according to the accelerator pedal position change amount ΔAP of the accelerator pedal, by the use of a table shown in FIG. 15. As shown in FIG. 15, the table is set such that when the accelerator pedal position change amount ΔAP is zero or less, the coefficient is set to a constant value, e.g. 2.0, while when the accelerator pedal position change amount ΔAP is in a range from zero to 0.5 deg/sec, the coefficient KACC is set to a constant value, e.g. 1.0. When the accelerator pedal position change amount ΔAP exceeds 0.5 deg/sec, the coefficient KACC is set to a larger value as the the accelerator pedal position change amount ΔAP increases.

According to the present embodiment, first, upon standing start of the vehicle, the optimal engine output torque TECMD0 is calculated at the step S202 and set as a lower limit value of the engine output torque for use in engine output control at the standing start (steps S108' and S203). Thus, the engine output torque is at least held at the lower limit value TECMD0 during the standing start of the vehicle. As a result, even when the vehicle is started on an ascending slope in such a manner that the accelerator pedal is suddenly or largely stepped on immediately after the shift position of the automatic transmission has been changed from the N or P position to the D range or from the D range to the R range, or that the shift position is similarly changed in a state where the accelerator pedal is stepped on, a gear-shifting shock can be reduced without the vehicle being moved backward.

Further, according to the present embodiment, since the engine output torque TEIDLE is increased toward the desired engine output torque TECMD by an amount corresponding to the accelerator pedal position change amount ΔAP of the accelerator pedal, the engine output torque TEIDLE can be smoothly increased up to the desired engine output torque TECMD by the use of an engine output torque increment commensurate with a change in the accelerator pedal position AP required by the driver in starting the vehicle.

Figure 11:
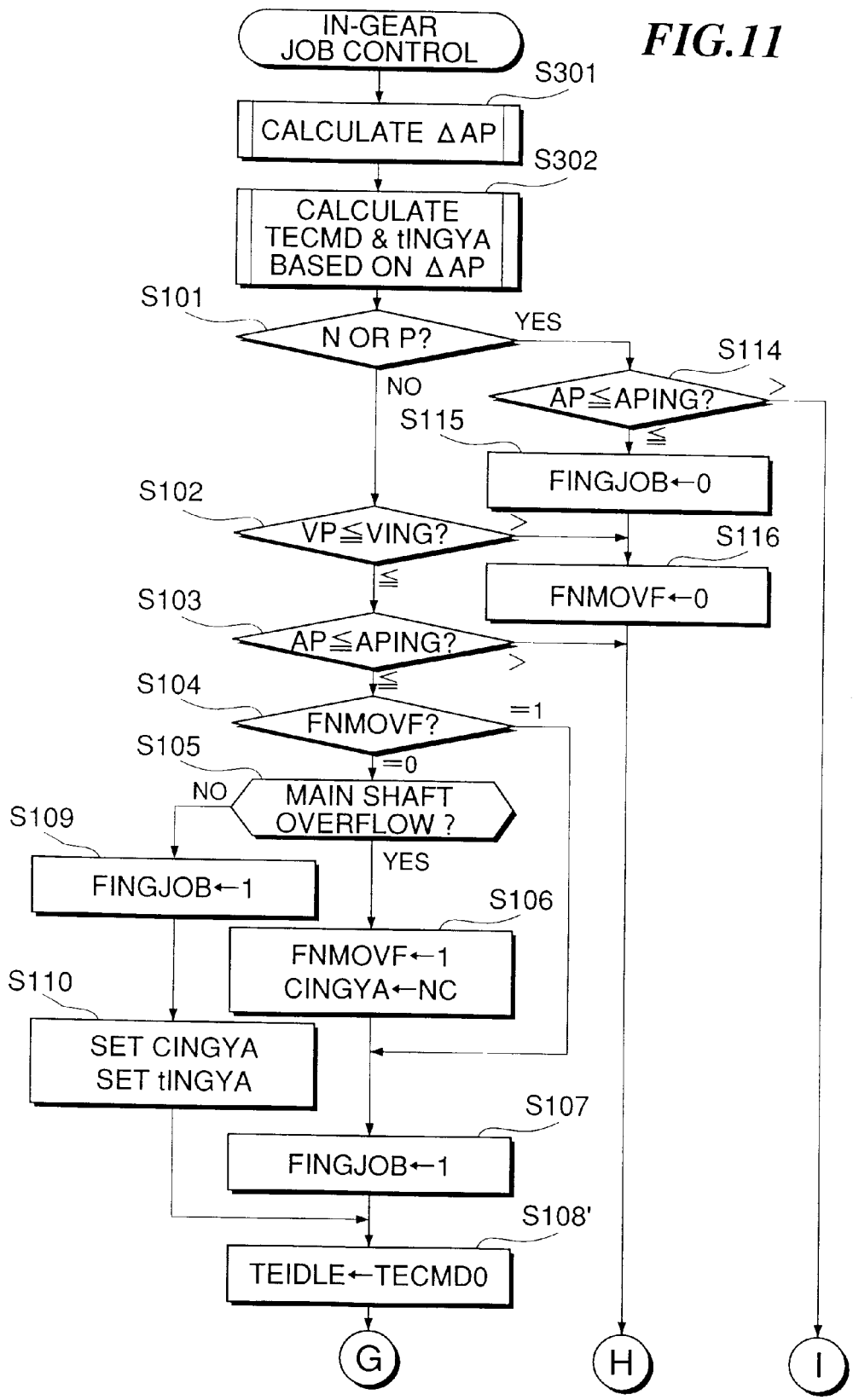
FIG. 11 is a flowchart showing a further continued part of the FIG. 9 routine.
Figure 12:
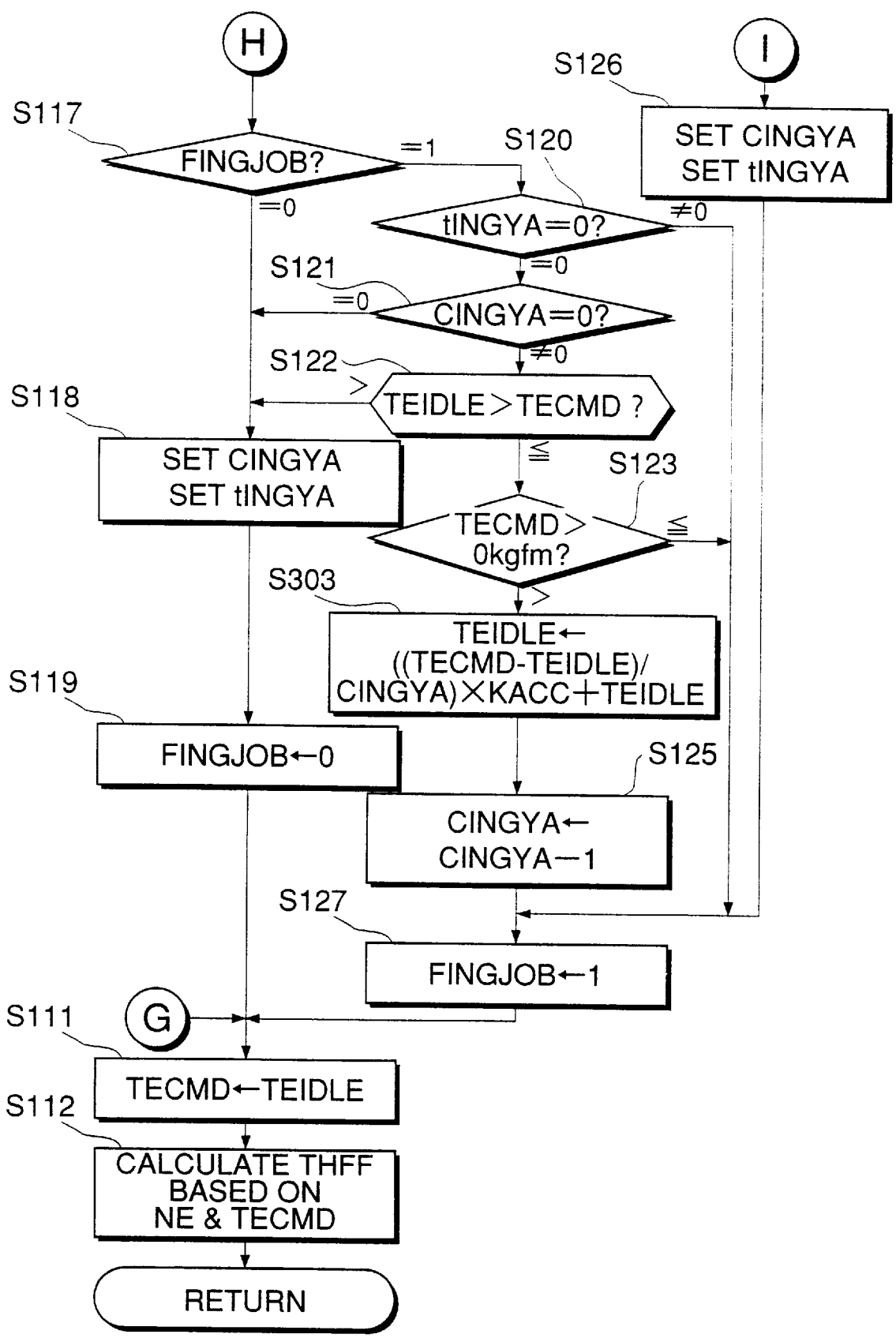
FIG. 12 is a flowchart showing a continued part of the FIG. 9 routine.
Figure 13:
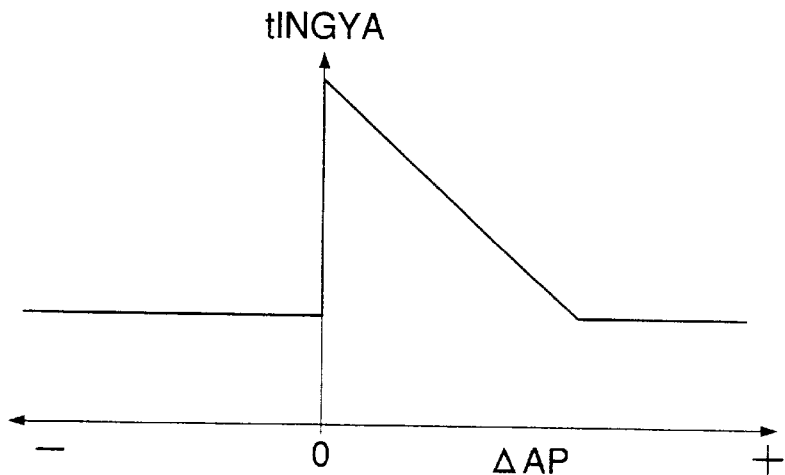
FIG. 13 shows a table for determining a predetermined time period tINGYA according to a change amount ΔAP in the accelerator pedal position.

Next, a third embodiment of the invention will be described with reference to FIGS. 11 through 15. FIGS. 11 and 12 show a flowchart of an in-gear job control routine according to the third embodiment, FIG. 13 shows a table for determining the predetermined time period tINGYA according to the accelerator pedal position change amount $\Delta AP$ of the accelerator pedal, and FIG. 14 a table for determining an engine output torque TEIDLE0 according to the accelerator pedal position change amount $\Delta AP$.

The present embodiment is identical in hardware with the first embodiment described above, but distinguished from the same in that the change amount $\Delta AP$ in the accelerator pedal position AP per unit time is detected, the engine output torque and the predetermined time period tINGYA over which the engine output torque is to be maintained are calculated based on the detected accelerator pedal position change amount $\Delta AP$, and the throttle valve opening $\theta TH$ is controlled such that the engine output torque becomes equal to the value calculated based on the detected accelerator pedal position change amount $\Delta AP$ over the predetermined time period counted by the timer tINGYA. In FIGS. 11 and 12, steps corresponding to those in the first embodiment are designated by identical step numbers, and description of them is omitted.

First, at a step S301 in FIG. 11, the change amount $\Delta AP$ in the accelerator pedal position AP per unit time is detected based on the output signal from the AP sensor 22, and then at a step S302, the desired engine output torque TECMD0 and the predetermined time period tINGYA over which the engine output torque TECMD0 is to be maintained are calculated based on the detected accelerator pedal position change amount $\Delta AP$. The desired engine output torque TECMD0 is read from a table shown in FIG. 14 according to the accelerator pedal position change amount $\Delta AP$, and the predetermined time period tINGYA is read from a table shown in FIG. 13 according to the detected accelerator pedal position change amount $\Delta AP$.

Figure 14:
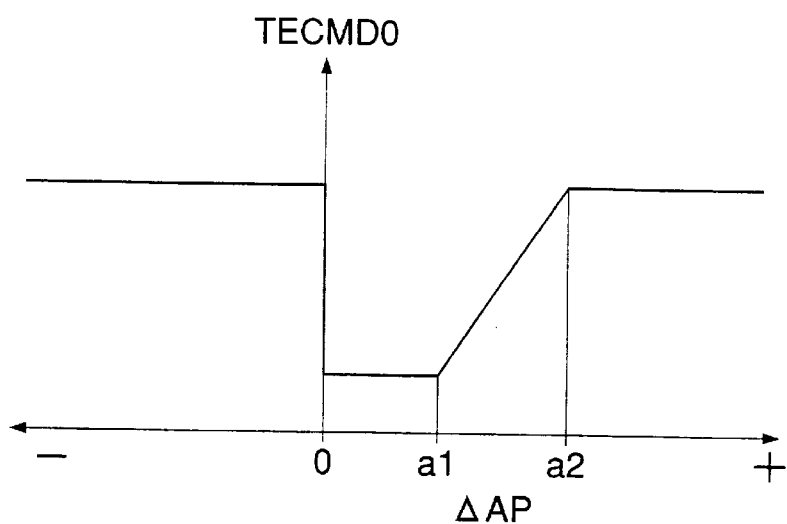
FIG. 14 shows a table for determining an engine torque TEIDLE0 according to the change amount ΔAP in the accelerator pedal position.

According to the FIG. 14 table, the desired engine output torque TECMD0 is set to a constant value when the accelerator pedal position change amount $\Delta AP$ is in a range from zero to a predetermined positive value a1 or when it is larger than a predetermined positive value a2 (>a1), while the output torque TECMD0 is progressively increased as the change amount $\Delta AP$ increases when the change amount $\Delta AP$ lies within a range between the predetermined values a1 and a2.

The desired engine output torque thus determined is set as the present engine output torque TEIDLE at a step S108' in FIG. 11.

According to the FIG. 13 table, the predetermined time period tINGYA is set to a constant value when the accelerator pedal position change amount $\Delta AP$ is zero or less or when it is larger than a predetermined positive value, while the predetermined time period tINGYA is progressively decreased as the change amount $\Delta AP$ increases when the change amount $\Delta AP$ lies in a range between zero and the predetermined positive value.

At a step S303 in FIG. 12, a calculation is made of the present engine output torque TEIDLE to progressively increase the torque TEIDLE toward the desired engine output torque TECMD. More specifically, the aforegiven equation (7) is used. An initial value of the engine output torque TEIDLE is set to the desired engine output torque TECMD0 calculated as above. The coefficient KACC in the equation (7) is read from the table shown in FIG. 15 similarly to the above described second embodiment, description of which is therefore omitted.

According to the present embodiment, upon standing start of the vehicle, the desired engine output torque TECMD0 and the predetermined time period tINGYA over which the desired engine output torque TECMD0 is to be maintained are calculated based on the accelerator pedal position change amount $\Delta AP$ at the step S302, whereby the engine output torque is held at the desired value TECMD0 over the predetermined time period tINGYA after the automatic transmission is put in gear or after the accelerator pedal is stepped on. As a result, when the vehicle is started in such a manner that the accelerator pedal is suddenly stepped on immediately after the shift position of the automatic transmission is changed from the N or P position to the D range or from the D range to the R range, or that the shift position is similarly changed in a state where the accelerator pedal is stepped on, a smooth standing start can be realized in a manner reflecting the driver's intention without spoiling the drivability.

Although in the above described embodiments the engine output torque is controlled by regulating the throttle valve opening, this is not limitative. Alternatively, the engine output torque may be controlled by regulating the retard amount of the ignition timing of the engine to achieve substantially the same results. In this alternative case, the retard amount of the ignition timing is calculated based on a torque correction amount DTESFT which is determined in dependence on the shift position SP, the engine output torque, the gear ratio of the automatic transmission, the vehicle speed VP, etc., and a basic ignition timing determined e.g. by the engine rotational speed NE and the intake pipe pressure PBA is corrected toward a retarded side by the retard amount to thereby reduce the engine output torque.

What is claimed is:

1. In an output torque control system for an internal combustion engine for a vehicle, said engine having an automatic transmission, said vehicle having an accelerator pedal, the output torque control system comprising:

output torque control means, responsive to an amount of stepping-on of said accelerator pedal, for controlling output torque from said engine;

shift position-detecting means for detecting a shift position of said automatic transmission;

standing start operation-detecting means for detecting an operation for starting said vehicle from a standing position thereof; and standing start control means, operable upon detection of said operation for starting said vehicle by said standing start operation-detecting means, for inhibiting, for a predetermined time period, said output torque control means from controlling said output torque from said engine to an increased value in response to said amount of stepping-on of said accelerator pedal, wherein said predetermined time period occurs after detection, by said standing start operation-detecting means, of said operation for starting said vehicle from said standing position thereof.

2. An output torque control system as claimed in claim 1, wherein said standing start operation-detecting means determines that said operation for starting said vehicle has been carried out, when said accelerator pedal has been stepped on and a change in said shift position of said automatic transmission has occurred.

3. An output torque control system as claimed in claim 1, wherein when said accelerator pedal has been stepped on immediately after said change in said shift position of said automatic transmission occurred, said standing start control means inhibits said output torque control means from controlling said output torque from said engine to said increased value in response to said amount of stepping-on of said accelerator pedal over said predetermined time period, and after said predetermined time period elapses, said standing start control means controls said output torque control means so as to progressively increase said output torque from said engine to a value corresponding to said amount of stepping-on of said accelerator pedal.

4. An output torque control system as claimed in claim 1 or 2, wherein when said change in said shift position of said automatic transmission has occurred in a state where said accelerator pedal has been stepped on, said standing start control means controls said output torque control means so as to hold said output torque from said engine at a value to be assumed when said engine is in a no-load condition over said predetermined time period, and after said predetermined time period elapses, said standing start control means controls said output torque control means so as to progressively increase said output torque from said engine to a value corresponding to said stepping-on amount of said accelerator pedal.

5. An output torque control system as claimed in any of claims 1 to 3, wherein said change in said shift position of said automatic transmission includes a change in said shift position of said automatic transmission from a shift position thereof for standing of said vehicle to a position thereof for traveling of said vehicle, and a change in said shift position of said automatic transmission from said shift position thereof for traveling of said vehicle to a shift position thereof for backward movement of said vehicle.

6. In an output torque control system for an internal combustion engine for a vehicle, said engine having an automatic transmission, said vehicle having an accelerator pedal, the output torque control system including output torque control means responsive to an amount of stepping-on of said accelerator pedal, for controlling output torque from said engine, and shift position-detecting means for detecting a shift position of said automatic transmission, the improvement comprising:
gradient-estimating means for estimating a gradient of a surface of a road on which said vehicle is standing or traveling;
output torque-calculating means for calculating a value of said output torque from said engine which can prevent a backward movement of said vehicle when said vehicle climbs said road, based on said gradient estimated by said gradient-estimating means; and
standing start control means operable when said accelerator pedal has been stepped on and a change in said shift position of said automatic transmission has occurred, for determining a control amount by which said output torque control means is to control said output torque from said engine, based on said amount of stepping-on of said accelerator pedal and said value of said output torque from said engine calculated by said output torque-calculating means.

7. In an output torque control system for an internal combustion engine for a vehicle, said engine having an automatic transmission, said vehicle having an accelerator pedal, the output torque control system including output torque control means responsive to an amount of stepping-on of said accelerator pedal, for controlling output torque from said engine, and shift position-detecting means for detecting a shift position of said automatic transmission, the improvement comprising:
change amount-calculating means for calculating a change amount in a position of said accelerator pedal;
output torque-calculating means for calculating a desired value of said output torque from said engine and a time period over which said desired value of said output torque from said engine is to be maintained, based on said change amount in said position of said accelerator pedal calculated by said change amount-calculating means; and
standing start control means operable when said accelerator pedal has been stepped on and a change in said shift position of said automatic transmission has occurred, for determining a control amount by which said output torque control means is to control said output torque from said engine, based on said amount of stepping-on of said accelerator pedal, and said desired value of said output torque from said engine and said time period calculated by said output torque-calculating means.

8. In an output torque control system for an internal combustion engine for a vehicle, said engine having an automatic transmission, said vehicle having an accelerator pedal, the output torque control system comprising:
output torque control means, responsive to an amount of stepping-on of said accelerator pedal, for controlling output torque from said engine;
shift position-detecting means for detecting a shift position of said automatic transmission;
standing start operation-detecting means for detecting an operation for starting said vehicle from a standing position thereof; and
standing start control means, operable upon detection of said operation for starting said vehicle by said standing start operation-detecting means, for inhibiting said output torque control means from controlling said output torque from said engine to an increased value in response to said amount of stepping-on of said accelerator pedal,
wherein when said change in said shift position of said automatic transmission has occurred in a state where said accelerator pedal has been stepped on, said standing start control means controls said output torque control means so as to hold said output torque from said engine at a value to be assumed when said engine is in a no-load condition over said predetermined time period, and after said predetermined time period elapses, said standing start control means controls said output torque control means so as to progressively increase said output torque from said engine to a value corresponding to said stepping-on amount of said accelerator pedal.

9. In an output torque control system for an internal combustion engine for a vehicle, said engine having an automatic transmission, said vehicle having an accelerator pedal, the output torque control system comprising:
output torque control means, responsive to an amount of stepping-on of said accelerator pedal, for controlling output torque from said engine;
shift position-detecting means for detecting a shift position of said automatic transmission;
standing start operation-detecting means for detecting an operation for starting said vehicle from a standing position thereof; and standing start control means, operable upon detection of said operation for starting said vehicle by said standing start operation-detecting means, for inhibiting said output torque control means from controlling said output torque from said engine to an increased value in response to said amount of stepping-on of said accelerator pedal, wherein said change in said shift position of said automatic transmission includes a change in said shift position of said automatic transmission from a shift position thereof for standing of said vehicle to a position thereof for traveling of said vehicle, and a change in said shift position of said automatic transmission from said shift position thereof for traveling of said vehicle to a shift position thereof for backward movement of said vehicle.

* * * * *